Patented May 7, 1940

2,199,927

UNITED STATES PATENT OFFICE 2,199,927

CELLULOSIC PELLICLE

William Frederick Underwood, Buffalo, N. Y., assignor to E. I. du Pont de Nemours & Company, Wilmington, Del., a corporation of Delaware No Drawing. Application March 17, 1937, Serial No. 131,531

5 Claims. (Cl. 106—40)

This invention relates to cellulosic structures, and more particularly it relates to a method for softening cellulosic structures by the incorporation therein of softening agents, and the product resulting therefrom.

This application is a continuation-in-part of my Patent No. 2,074,349.

In the manufacture of cellulosic materials precipitated from aqueous solutions, such as regenerated cellulose pellicles, including sheets or films, caps, bands, continuous tubing, artificial straw and the like, it has long been customary to incorporate into the cellulosic pellicle a softening agent in order to maintain it in a flexible condition. Such cellulosic pellicles which are free from a softening agent are known to be quite brittle and while a softener-free pellicle may find certain uses, the softened and therefore flexible sheet or film is much more generally useful. Heretofore, as softeners for regenerated cellulose pellicles, the art has employed such substances as ethylene glycol, propylene glycol, diethylene glycol, glycerol, and the like, but, of these, by far the most important is glycerol which has hitherto known no equal as a softening agent for producing flexible, transparent and durable cellulosic pellicles such as those of regenerated cellulose. Despite the numerous advances which have been made in the production and development of cellulosic pellicles, no softening agent has thus far been found which can be successfully applied as a substitute for glycerol without seriously restricting the utility of the product.

Glycerol is obtained commercially primarily as a by-product from the soap industry. As a by-product, the quantity may be limited and hence glycerol is subject to market fluctuation of supply as well as price. The glycols, mentioned above as useful cellulose softeners, are for the most part obtained synthetically and consequently they are relatively expensive. For an industry consuming large amounts of these materials, therefore, the development of less expensive equivalents or means for reducing the consumption of expensive materials will lead to marked economies in production.

It has now been found that particularly desirable softness can be imparted to cellulosic structures of the type above referred to by the incorporation therein of a water-soluble hydroxyalkyl derivative of ammonia. This substance may replace glycerol in whole or in part as will appear more specifically hereinafter.

It is therefore an object of this invention to provide a new and useful method for preparing cellulosic pellicles having a satisfactory rigidity, elongation, flexibility, durability and transparency.

It is a further object of this invention to provide a cellulosic pellicle treated with a softening agent which will not interfere with any subsequent treatment of the cellulosic pellicle, such as the application of surface coatings, ink, coloring matter, adhesives, or the like.

A still further object of this invention is to provide a rigid, flexible, transparent, durable, cellusosic pellicle such as a sheet or film of regenerated cellulose suitable for use as a wrapping tissue, treated with a softening agent comprising a hydroxyalkyl derivative of ammonia.

Other objects of the invention will appear hereinafter.

By the term "rigidity" or its equivalent as used herein is meant that property which is the opposite of limpness, in other words, rigidity in the sense that the pellicle can be advanced in a wrapping machine or similar apparatus without curling, crumpling, or otherwise fouling the machine.

The term "durability" is used to define resistance to shock or rough handling. Thus, for example, bags may be fabricated from the pellicles and filled with some standard material such as a certain weight of dried beans and the package sealed, whereupon the durability may be measured against a known standard by tumbling the package under standard conditions and noting the resistance to breakage of the wrapper.

The objects of this invention can be attained generally by substituting a hydroxyalkyl derivative of ammonia having a boiling point of at least 175° C. at a pressure of 760 mm. of mercury and a solubility of at least 5% in water at a temperature of 60°–70° C., for glycerol as a softening agent. The hydroxyalkyl derivative of ammonia can be substituted in whole or in part for the glycerol.

As a base, the invention contemplates the use of any cellulosic structure, particularly sponges and structures of pellicular nature such as a sheet or film, artificial straw, cap, band or continuous tube, such as may be obtained by the coagulation and/or regeneration from an aqueous cellulosic dispersion in accordance with the procedure customary to the art. Thus, the invention comprehends the use of regenerated cellulose pellicles such as may be obtained from the viscose or cuprammonium processes, glycol cellulose, cellulose glycollic acid, lowly esterified or lowly etherified cellulose derivatives where there is only one ether or ester group associated with several cellulose units, and other cellulosic structures of similar character. Similarly, various types of paper, especially of the "glassine" type may be used as base materials. As a matter of convenience, the invention will be described in terms of its application to the softening of regenerated cellulose pellicles such as those sheets or films of regenerated cellulose which are suitable for use as wrapping tissues.

In the manufacture of regenerated cellulose sheets or films, as for example by the viscose process, the cellulosic dispersion is cast through suitable apparatus into coagulating and/or regenerating baths from which it is finally obtained in the form of a continuous cellulosic sheet which is customarily led in a continuous manner through a series of purifying, bleaching and washing operations. Just prior to the drying operation which is also usually continuous and coordinated with the casting operation, the film is passed through a bath containing a softening agent in such concentration that after the excess liquid has been removed from the surface of the sheet by suitable squeeze rolls and the excess moisture removed by passage through the drier, the final sheet can be wound up in a continuous fashion and will contain an appropriate predetermined amount of softening agent. The commercially available regenerated cellulose film contains approximately 4–8% moisture and depending upon the particular uses to which the product is destined, the softening agent, usually glycerol, may vary from about 8–25%, based on the combined weight of the cellulose and softening agent in the sheet.

The invention contemplates subjecting the base sheet or film to a bath containing a hydroxyalkyl derivative of ammonia in aqueous solution or in solution in an organic solvent. After treatment with the solution, the base is dried and may subsequently be provided with a surface coating, such as a moistureproof film or coating. Furthermore, when the softening agent is soluble in the solvent of the surface coating, the base may be treated with the softening agent simultaneously with the application of the coating composition. In this latter case, the softening agent to be applied simultaneously with the coating solution, is added or incorporated in the coating composition.

The quantity of hydroxyalkyl derivative of ammonia introduced into the base depends upon the composition of the base and the desired degree of flexibility in the final product and hence may vary within wide limits. Satisfactory results have been secured with a regenerated cellulose base when 5% to 19% and even up to 30% or more, and preferably 15 to 18%, of the hydroxyalkyl derivative of ammonia is contained in the final product. The percentages stated above are based on the combined weight of cellulose and softener in the final product. When the total softener content of the final product is less than 5% it will not have the desired degree of softness, and when the product has a total softener content exceeding 19%, except in the case of heavy gage films, it often presents a slightly colored appearance which is usually objectionable. However, when the hydroxyalkyl derivative of ammonia is mixed with other softeners less than 5% of the former can be used to advantage. In order to obtain a material softening effect from the hydroxyalkyl derivative of ammonia in mixtures of softeners it should constitute at least 10% of the total weight of the combined softeners. For example, when the mixed softener constitutes 15% of the total weight of the product at least 1.5% of the total weight should be hydroxyalkyl derivative of ammonia.

In accordance with the preferred form of this invention, a sheet or film of regenerated cellulose is passed through an aqueous bath containing the hydroxyalkyl derivative of ammonia, the excess bath being removed in any suitable manner, such as, for example, by squeeze rolls, wipers, and the like, and the film dried subsequently thereto. Inasmuch as the softening agent contemplated by this invention is stable and substantially non-volatile at ordinary temperatures, it is immaterial whether or not a surface coating is applied thereto, nor is it material whether or not a surface coating is applied immediately after treatment with a softening agent or after a considerable lapse of time.

It may, at times, be desirable to incorporate the softening agent in the sheet or film from a solution of the same in an organic solvent, such as, for example, alcohol, acetone, diethyl ether, toluene, benzene, or ethoxyethanol. In such case, the water in the gel regenerated film is preferably first displaced with a quantity of the solvent in which the softener is dissolved, after which the softening agent in solution is applied thereto. Where a solvent for a softener is used which is immiscible in water, the water will preferably first be removed by displacement with an intermediate liquid material which is miscible with both the softener solvent and water, after which the said intermediate material is displaced with a quantity of the softener solvent prior to treatment with the softener solution.

The total amount of softener is controlled primarily by the total amount of softening agent in the treating bath, although the film thickness, rate of passage through the bath, temperature of the bath, etc. may also contribute there to to a certain extent. The regenerated cellulose pellicle, upon reaching the treating bath, is in a highly swollen and hydrated condition and usually the cellulose of the pellicle is associated with 300% or more of water. This highly swollen and wet pellicle, usually referred to as the gel sheet, is impregnated with the treating bath and because of the large amount of water associated with the cellulose, it is apparent that the removal of this water during the drying operation will concentrate the softening agent with respect to the cellulose content of the pellicle. For example, if a regenerated cellulose pellicle containing about 15% total softener is desired as a final product, the concentration of the softener in the treating bath will be adjusted to approximately one-third that value, or about 5%. This is particularly true when the softening agents are substantially non-volatile and are not vaporized during the drying operation.

The following example will illustrate the practice of the invention, it being understood that the invention is not to be limited thereby:

*Example.*—A sheet or continuous film of gel regenerated cellulose, which will have a final dry thickness of about 0.0012", is immersed in or drawn through a bath consisting of a 5% aqueous solution of triethanolamine. The sheet or film is allowed to remain in contact with the bath for a time sufficient to permit the establishment of equilibrium (preferably not longer than five minutes) whereupon the excess liquid is removed by suitable devices such as scraper rods, squeeze rolls, blotters or the like. The film is then dried in such a manner as will maintain it substantially free from wrinkles, the drying temperature being of the order of 70° C. The resultant film is clear, non-greasy and quite soft.

The above example has been set forth in terms of a sheet or film of gel regenerated cellulose. Obviously, this is the more practical way of practicing the invention since the softening agent is customarily incorporated into the sheet or film while the latter is in the gel state and during the normal course of manufacture. If one desires to impregnate an already dried regenerated cellulose film with a softener of the character described, it is possible to rewet the dried film so as to render it highly swollen, whereupon it may be treated with treating baths similar to those described but of composition suitable for obtaining the final product desired. In the same way, any of the sheets set forth as equivalent to regenerated cellulose sheets can be substituted in the specific example cited above.

By the term "hydroxy alkyl derivative of ammonia" as used throughout the specification and claims is meant a substance having the general formula:

$$\begin{array}{c} R_1 \\ \phantom{R_1}\diagdown \\ \phantom{R_1R_1}N-ROH \\ \phantom{R_1}\diagup \\ R_2 \end{array}$$

in which R, R₁ and R₂ may be an aliphatic, aromatic, aromatic-aliphatic or aliphatic-aromatic hydrocarbon radical, which radicals may contain substituent groups or linkages, such as hydroxyl, carbonyl, cyclic, amido, keto, ether or thioether, and in which R₁ and R₂ may be an acyl group or hydrogen; and the salts thereof.

When R, R₁ or R₂ are hydrocarbon radicals, it is preferred that such radicals contain not more than six carbon atoms, and it is still further preferred that the total carbon atom content of R, R₁ and R₂ is not in excess of six carbon atoms.

As representative examples of types of hydroxy alkyl derivatives of ammonia which may be used as a softening agent in accordance with the present invention may be mentioned:

$$\begin{array}{c} HO-CH_2-CH_2 \\ \phantom{HO-CH_2-CH_2}\diagdown \\ \phantom{HO-CH_2-CH_2-}N-CH_2-CH_2-OH \\ \phantom{HO-CH_2-CH_2}\diagup \\ HO-CH_2-CH_2 \end{array}$$
Triethanol amine $$H \\ | \\ HO-CH_2-CH_2-N-CH_2-CH_2-OH$$
Diethanol amine $$H \\ | \\ H-N-CH_2-CH_2-OH$$
Monoethanol amine Homologues of mono-, di- and triethanol amine such as mono-, di- and tripropanol amine and mono-, di- and tributanol amine.

$$H-\overset{H}{\underset{|}{N}}-CH-OH$$
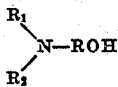
Benzylol amine $$\overset{H}{\underset{|}{N}}-CH_2-CH_2-OH$$
Ethylol phenyl amine $$H-\overset{H}{\underset{|}{N}}-\bigcirc-OH$$
Phenylol amine (p-hydroxy phenyl amine)

$$HO-\bigcirc-\overset{H}{\underset{|}{N}}-\bigcirc-OH$$
Diphenylol amine (p-p′ di hydroxy diphenyl amine)

$$\bigcirc-\overset{H}{\underset{|}{N}}-CH_2-CH_2-OH$$
Mono ethylol aniline $$H \\ | \\ H-N-CH_2-CH_2-S-CH_2-CH_2-OH$$
β-amino, β′-hydroxy diethyl sulfide $$H \\ | \\ H-N-CH_2-CH_2-O-CH_2-CH_2-OH$$
β-amino, β-hydroxy diethyl ether

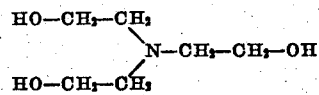
Methylol pyridine

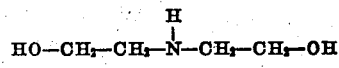
Methylol α-picoline $$(HO-CH_2-CH_2)_3-N.HOOC-\bigcirc-CO-\bigcirc$$
Triethanolamine benzoyl benzoate $$H \\ | \\ HOCH_2NCH_2(CHOH)_4CH_2OH$$
Mono-methylol glucamine $$CH_3-N(CH_2-CH_2-OH)_2$$
Diethylol methyl amine $$\begin{array}{c} C_2H_5 \\ \phantom{C_2H_5}\diagdown \\ \phantom{C_2H_5-}N-CH_2-CH_2-OH \\ \phantom{C_2H_5}\diagup \\ C_2H_5 \end{array}$$
Diethyl ethylol amine $$H-\overset{H}{\underset{|}{N}}-CH_2-\overset{}{\underset{\underset{CH_3}{|}}{CH}}-CH_2-OH$$
Isobutanol amine $$HO-CH_2-\overset{}{\underset{\underset{CH_3}{|}}{CH}}-CH_2-\overset{H}{\underset{|}{N}}-CH_2-\overset{}{\underset{\underset{CH_3}{|}}{CH}}-CH_2-OH$$
Di isobutanol amine

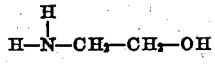
Morpholine ethanol

As salts of the above compounds which have been found particularly desirable are the formate, glycollate, lactate, sulfate, HCl, oxalate, phosphate, acetate ricinoleate, linoleate and sulfonic salts thereof.

It is furthermore to be understood that two or more of the softening agents above mentioned may be used in combination with each other, or one or more of the above mentioned softening agents may be used in combination with one or more known softening agents, for example, a mixture of triethanolamine and glycerol in the ratio of 2:1 will operate to very good advantage.

If a colored cellulosic pellicle is desired, it may be obtained in any of the ways commonly known in the art including the passage of the sheet or film through a bath containing a suitable dyestuff. If desired, the dyestuff may be added to the bath used for introducing the softening agent. In the same way, after the film has been treated with the softening agent, it may be subjected to any of the customary after-treatments such as sizing or coating, or the like, which may be customarily given to cellulosic pellicles of the type described in just the same manner that a glycerol softened regenerated cellulose film, for example, may be treated.

Since the softening agents of the present invention can be obtained synthetically, they are available in unlimited quantity independent of a natural source. The use of the newly described softening agents results in a product having satisfactory physical characteristics, particularly transparency, flexibility, durability, and the like.

The softeners set forth by this invention have been described in terms of their use in connection with the softening of cellulosic pellicles, but it should be understood that such softeners are useful in other roles such as those normally played by such substances as glycerol.

Since it is obvious that various changes and modifications may be made in the above description without departing from the nature and spirit thereof, it is to be understood that the invention is not to be limited thereto except as set forth in the appended claims.

I claim:

1. A flexible, durable pellicle consisting of regenerated cellulose impregnated with softener therefor, said softener consisting of 15% to 18% of a hydroxyalkyl derivative of ammonia having a boiling point of at least 175° C. at a pressure of 760 mm. of mercury and a solubility of at least 5% in water at a temperature of 60°–70° C.

2. A flexible, durable pellicle consisting of regenerated cellulose and 15% to 18% triethanolamine as a softener therefor.

3. A flexible, durable pellicle consisting of regenerated cellulose impregnated with 15% to 18% softener thereof, said softener being tripropanol amine.

4. A flexible, durable pellicle consisting of regenerated cellulose impregnated with 15% to 18% softener therefor, said softener being tributanol amine.

5. A flexible, durable pellicle consisting of regenerated cellulose sheet of about 0.0012 inch thickness impregnated with 15% of a softener therefor, said softener being triethanol amine.

WILLIAM FREDERICK UNDERWOOD.